(No Model.)
W. H. HOLDEN.
ELASTIC TIRE FOR VEHICLE WHEELS.
No. 574,682.　　　　　　　　　　　Patented Jan. 5, 1897.
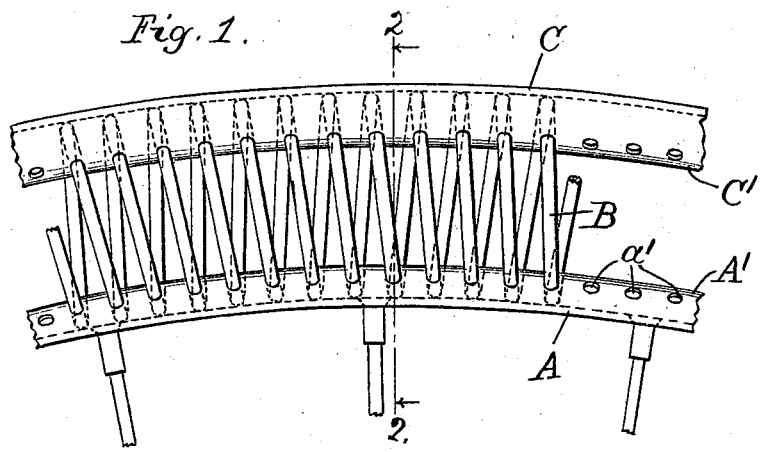
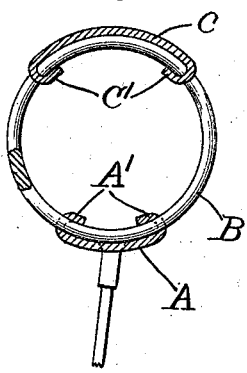
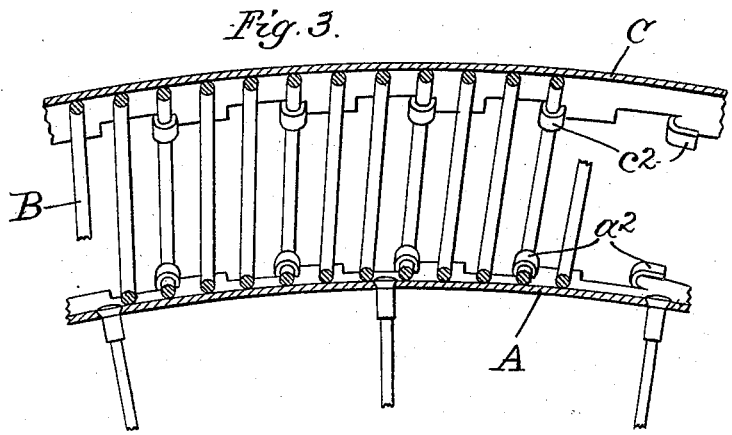
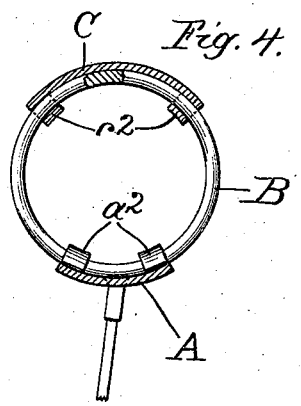
Witnesses.
E. T. Wray.
Jean Elliott.
William H. Holden
Inventor.

UNITED STATES PATENT OFFICE.

WILLIAM H. HOLDEN, OF CHICAGO, ILLINOIS.

ELASTIC TIRE FOR VEHICLE-WHEELS.

SPECIFICATION forming part of Letters Patent No. 574,682, dated January 5, 1897.

Application filed March 21, 1896. Serial No. 584,237. (No model.)

*To all whom it may concern:*

Be it known that I, WILLIAM H. HOLDEN, a citizen of the United States, residing at Chicago, county of Cook, and State of Illinois, have invented certain new and useful Improvements in Elastic Tires for Vehicle-Wheels, which are fully set forth in the following specification, reference being had to the accompanying drawings, forming a part thereof.

The purpose of this invention is to provide an improved tire for vehicles, especially such as bicycles, which shall absorb the concussion and vibration due to travel of the wheel on the road, and which shall be capable of being made durable, and which may be adapted to be substituted for the pneumatic tires in common use without their prominent defects.

In the drawings, Figure 1 is a side elevation of a wheel having my improved tire. Fig. 2 is a transverse section as at the line 2 2 on Fig. 1. Fig. 3 is a detail section showing a modified form of the felly and tread-rim, the modification being such as may be adopted in either part without being adopted in the other. Fig. 4 is a similar section showing a further modification.

The wheel-rim or felly A, in order to receive my improved tire, is preferably formed peripherally concave, as if to receive a tubular tire of ordinary construction, but it is provided with inturned lips A' A', which are perforated at short intervals throughout the entire circumference of the wheel, the perforations $a'$ $a'$, &c., being made through the inturned lip immediately adjacent to the body of the rim from which the lip is thus inturned, that is, at the root of the lip. The source of resiliency in my improved tire is a coiled spring B of sufficient length to extend around the entire wheel and have its ends joined, making an endless spiral encircling the wheel. It is, however, joined together and made endless after being gotten in place on the wheel-rim, as hereinafter explained.

C is a tread-rim, preferably of metal, and quite similar to the wheel-rim A. It is outwardly convex and inwardly concave, and has inturned lips C' C' similar to the lips A' A' of the wheel-rim or felly A. The radius of the tread-rim C, measuring to the middle of the inner concave surface, is greater than that of the felly A, measuring the latter also at the middle or deepest part of its peripheral concavity, by the amount of diameter of the coiled spring B, and this spring is introduced between the two by reeving or threading it through the eyelets in the flanges A' and C' of the felly and tread-rim, respectively, so that it is made to connect these two parts together. If it should be found difficult to thus introduce a single continuous coiled spring around the tire, it may be introduced in pieces of any practicable length, the adjacent lengths being joined after all are in position. It may not be found necessary in all cases to join the pieces together.

It may be found feasible, and preferable on account of convenience in assembling the parts, to provide as the means of attaching the springs to the other two parts hooks struck up from the metal of the felly and tread-rim, respectively, under which the several coils, or so many of the coils as deemed necessary, of the spring may be lodged, the hooks then being bent down to prevent the escape of the coils therefrom, thus constituting eyes as effectual as if they were formed by perforating the flange or lip. Such structure is shown in Figs. 3 and 4, such hooks forming eyes being indicated by the letter $a^2$ on the felly and $c^2$ on the tread-rim.

I do not limit myself to the specific mode shown of attaching the spring to the tread-rim and felly; but it is essential, in order to attain the result at which I aim, that the spring should constitute a positive connection between the tread-rim and felly and not merely that it should be retained between them.

In the use of my improved tire the pressure experienced by the tire at the lower side of the wheel where it is in contact with the ground is transmitted to the tread-rim, which, being exposed to a flattening pressure at the ground side, is compelled to bulge somewhere else to compensate for the flattening, and being restrained from bulging at the several coils of the spring which are connected to the felly and tread-rim it distributes the weight of the load throughout the spring, and thus makes the resiliency of the whole spring available to sustain the load, which is apparently pressing the tread at only one point. In this respect the spring operates somewhat in the same manner as the compressed air in the pneumatic tire, but with this advantage over the air as a medium for transmitting the pressure that whereas in the pneumatic tire the entire compression of the whole volume of air in the tire, due to the load, results in flattening only at the part in contact with the roadway, the same pressure, operating on my improved tire only at the point in contact with the roadway, does not flatten the tread-rim perceptibly at that point, but tends rather simply to rotate it slightly about the axis of the wheel relatively to the felly, inclining each coil of the spring a little and elongating it in the direction of the plane of the wheel, flattening it correspondingly transversely, thus distributing not only the strain, but the flattening effect throughout the entire circumference. This result, which is theoretically obtained, is obtained practically, except in so far as the play or lost motion of the several coils in the eyelets in which they are retained may prevent the complete transmission of the strain around the wheel and permit some flattening of the rim at the point resting on the roadway and immediately exposed to the pressure of the load. It will be observed that the result thus described is dependent upon the substantial non-extensibility of the tread-rim—that is, the fact that that rim cannot stretch circumferentially under the strain of the load transmitted to it through the spring; and my tire is therefore in this action radically different from tires made by merely inclosing a spiral spring in a tube of rubber or fabric. In the case of such structures the spring serves merely to keep the tube distended, and operates, practically, upon the same principle as the compressed air in the pneumatic tube, whereas, when a non-extensible tread-rim is employed, positively but pivotally connected to the several coils of the spring, the principle governing the action is essentially different, as above explained.

I claim—

1. In a vehicle-wheel, in combination with the felly, a non-extensible tread-rim and a spiral spring whose axis is a circle intermediate the felly and tread-rim, such spiral spring being positively and pivotally connected at its several coils respectively to the felly and tread-rim.

2. In a vehicle-wheel, in combination with the felly a non-extensible tread-rim of greater diameter than the felly, and a spiral spring whose axis is a circle intermediate the felly and the tread-rim, said felly and tread-rim having eyelets in which the several coils of the spiral spring are engaged, whereby the spring connects the two parts positively.

3. In a vehicle-wheel, in combination with the felly and a non-extensible tread-rim of greater diameter than the felly, each of said parts having a perforated flange facing the other part, and a spiral spring whose axis is a circle intermediate the felly and rim having its coils engaged with the perforations of said flanges respectively.

4. In a vehicle-wheel, in combination with the felly having inturned perforated lips at its lateral edges, a non-extensible tread-rim having also inturned perforated lips; and a spiral spring whose axis is a circle intermediate the felly and tread-rim, the coils of the spiral spring being engaged respectively in the perforations of the felly and tread-rim; substantially as set forth.

5. In a vehicle-wheel, in combination with a peripherally-concave felly having its lateral edges inturned and perforated, a non-extensible tread-rim which is inwardly concave and has its lateral edges also inturned and perforated; a spiral spring whose axis is a circle intermediate the felly and tread-rim adapted to seat in the concavities of said parts and having its several coils engaged in the perforations of their lips respectively.

In testimony whereof I have hereunto set my hand, at Chicago, Illinois, this 18th day of March, 1896, in the presence of two witnesses.

WILLIAM H. HOLDEN.

Witnesses:
 CHAS. S. BURTON,
 FRANCIS M. IRELAND.